US007974776B2

(12) United States Patent
Kim et al.

(10) Patent No.: US 7,974,776 B2
(45) Date of Patent: Jul. 5, 2011

(54) SYSTEM AND METHOD FOR PROVIDING ORIGIN AND DESTINATION GUIDE INFORMATION

(75) Inventors: Do-Sung Kim, Seoul (KR); Min-Hui Park, Uijeongbu (KR); In-Joon Choi, Seoul (KR); Jin-Kyung Park, Seoul (KR)

(73) Assignee: SK Corporation, Seorin-dong, Jongro-gu, Seoul (KR)

( * ) Notice: Subject to any disclaimer, the term of this patent is extended or adjusted under 35 U.S.C. 154(b) by 1051 days.

(21) Appl. No.: 11/573,975

(22) PCT Filed: Aug. 19, 2005

(86) PCT No.: PCT/KR2005/002744

§ 371 (c)(1), (2), (4) Date: Feb. 20, 2007

(87) PCT Pub. No.: WO2006/019284

PCT Pub. Date: Feb. 23, 2006

(65) Prior Publication Data

US 2009/0018765 A1 Jan. 15, 2009

(30) Foreign Application Priority Data

Aug. 20, 2004 (KR) ........................ 10-2004-0066012

(51) Int. Cl.
*G01C 21/00* (2006.01)

(52) U.S. Cl. ........................................................ 701/201

(58) Field of Classification Search .......... 701/201–203, 701/206–209, 211–213; 340/988, 990, 995.1
See application file for complete search history.

(56) References Cited

U.S. PATENT DOCUMENTS

| | | | | |
|---|---|---|---|---|
| 5,583,494 | A * | 12/1996 | Mizutani et al. | 340/995.14 |
| 5,845,228 | A * | 12/1998 | Uekawa et al. | 701/209 |
| 2002/0165664 | A1 | 11/2002 | Park | |
| 2003/0225512 | A1 * | 12/2003 | Kim et al. | 701/209 |

FOREIGN PATENT DOCUMENTS

WO WO02/15148 2/2002

* cited by examiner

*Primary Examiner* — Kim T Nguyen
(74) *Attorney, Agent, or Firm* — Lexyoume IP Group, PLLC.

(57) ABSTRACT

A system for providing origin and destination guide information selects an origin position of a vehicle, and selects a destination link that is a road near the destination in consideration of a position and a type (crossroads, apartment complex, park, or superhighway) of the destination that the vehicle reaches, generates a path from origin to destination based on the selected origin link, the destination link, and real-time traffic information (or map link information), generates guide information including an adjacent map of the generated path and speech information, and provides the guide information to the vehicle terminal. According to the present invention, the system generates the optimized path from the current position to the desired destination and provides the optimized path to the user.

6 Claims, 8 Drawing Sheets

PRIOR ART

SYSTEM AND METHOD FOR PROVIDING ORIGIN AND DESTINATION GUIDE INFORMATION

FIELD OF THE INVENTION

The present invention relates to a system and method for providing path information. More specifically, the present invention relates to a system and method for providing a scheme for selecting origin and destination links and path guide information.

DESCRIPTION OF THE RELATED ART

Recently, various vehicles such as ships, airplanes, and cars have been using a global positioning system (GPS) for checking current positions and speeds or determining paths. A navigation system detects the vehicle's position by using the GPS and applies it to map matching or selection of an origin position. The conventional navigation system selects the road nearest the current position as the origin link. When the road nearest the current position of the vehicle is selected as the origin link, a road that is not easy for the user to access from the current position may be selected when superhighways and general-purpose roads are provided near the user, and hence, the user may not drive along the designated path.

A conventional destination selecting method also selects the road near the destination coordinates as a destination link, and various methods for reaching the destination are available when a crossroads is given as a destination. If a link near the crossroads is determined as a destination, a roundabout route guide to the destination may be provided, or the guide path may be terminated on superhighways or urban expressways inaccessible to the desired destination. A case in which an inappropriate path is provided according to the conventional destination selection method will now be described with reference to FIG. 1.

FIG. 1 shows a path provided by the conventional destination selection method.

As shown, the origin is the Bangbae Office and the destination is the Sadang Station crossroads where the Sadang overpass is located in the east-to-west direction. When the user selects the Sadang Station crossroads as a destination according to the conventional destination selection method, the Sadang overpass may be erroneously selected for the destination, and a route 10 leading to the Sadang overpass is accordingly provided. As a result, the user must drive on the Sadang overpass far to the west of the Sadang Station crossroads and then make a U-turn, thereby wasting time.

Further, a path providing method for selecting an adjacent link as a destination link with no consideration of access direction to the destination terminates provision of a path in a direction different from the direction available for access to the destination, and hence the user cannot directly drive to the destination when arriving at the destination.

As described, the path guide according to the conventional origin or destination selection method considers no items required for selecting origin or destination links so that the user may travel a roundabout way or fail to reach the destination.

SUMMARY OF THE INVENTION

It is an advantage of the present invention to provide a system and method for providing origin and destination guide information for preventing time and resource loss caused by failure to arrive at the destination.

In one aspect of the present invention, a system for providing origin and destination guide information to a vehicle terminal connected through a wireless network comprises: an origin selector for selecting an origin link that is a road adjacent to the origin according to a direction and a current position of the vehicle; a destination selector for selecting a destination link that is a road adjacent to the destination according to a position and a type of the destination; a path generator for generating a path from the origin link to the destination link based on the selected origin link, the selected destination link, real-time traffic information, and map information; a guide information generator for generating guide information having at least one of an adjacent map of the generated path and speech information on the path; and a guide information provider for providing the generated guide information to the vehicle terminal.

The destination selector selects a destination link so that the destination may be positioned on the right of the vehicle's progressing direction when driving on the right, and selects a destination link so that the destination may be positioned on the left of the vehicle's progressing direction when driving on the left.

In another aspect of the present invention, a method for providing origin and destination guide information to a vehicle terminal connected through a wireless network comprises: a) selecting an origin link that is a road near the origin according to a direction and a current position of the vehicle; b) selecting a destination link that is a road near the destination in consideration of a position and a type of the destination; c) generating a path from the origin link to the destination link based on the selected origin link, the selected destination link, real-time traffic information, and map link information; and d) generating guide information having at least one of an adjacent map of the generated path and speech information, and providing the generated guide information to the vehicle terminal.

DETAILED DESCRIPTION OF THE ILLUSTRATED EMBODIMENTS

Figure 1:
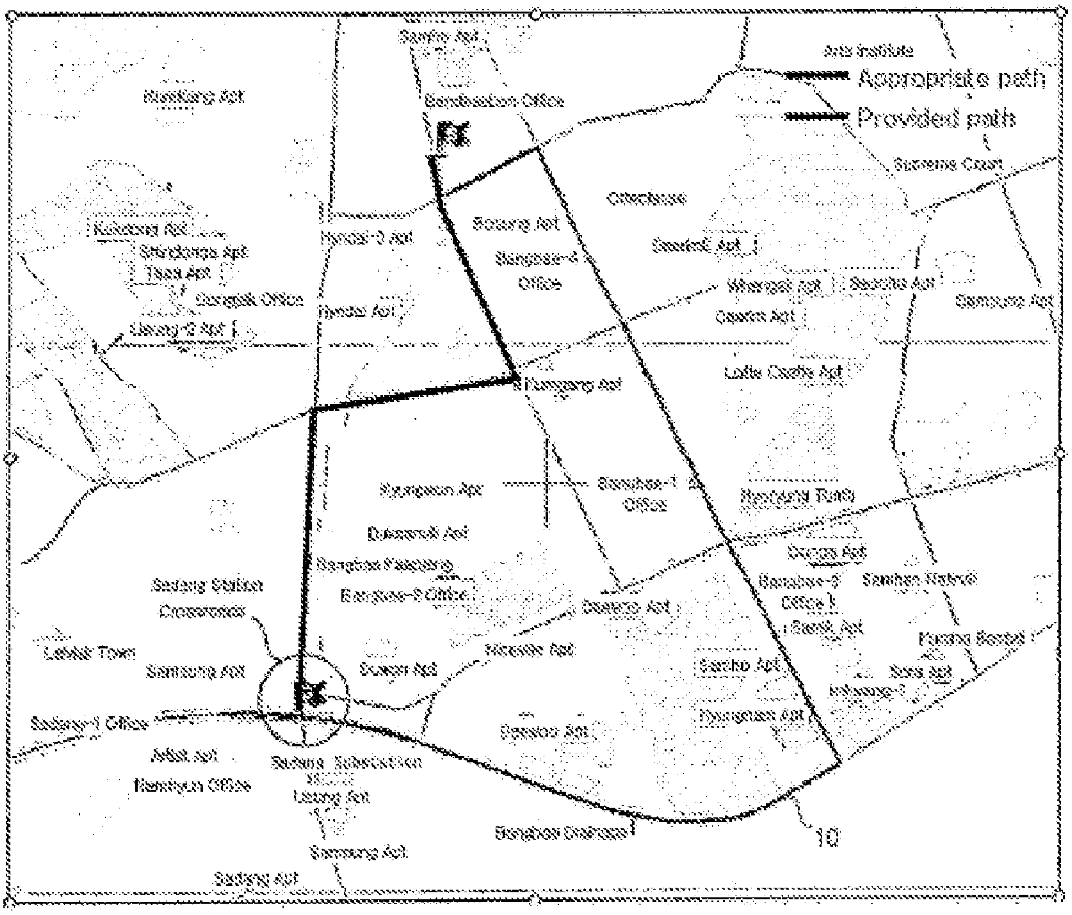
FIG. 1 shows a path provided by the conventional destination selection method.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

For ease of description, a road network will be referred to as a network which includes a node and a link. The node represents a point connecting lines, and the link indicates a line between nodes.

Figure 2:
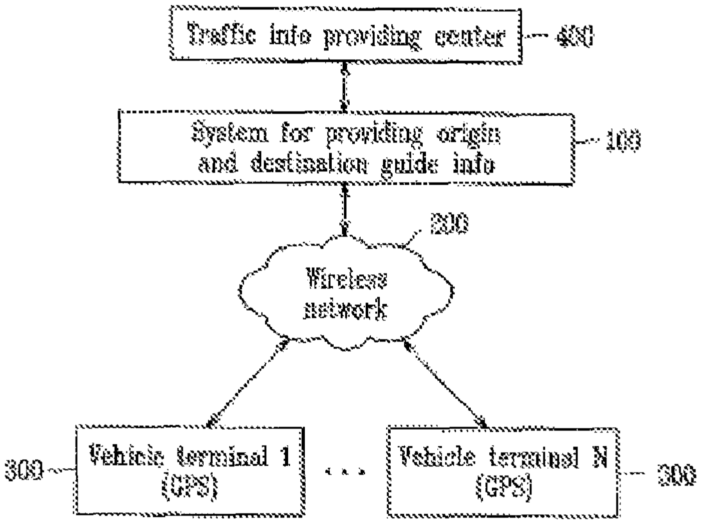
FIG. 2 shows a configuration of a system for providing origin and destination guide information according to an exemplary embodiment of the present invention.

FIG. 2 shows a configuration of a system for providing origin and destination guide information according to an exemplary embodiment of the present invention.

As shown, the system 100 for providing origin and destination guide information is connected to a vehicle terminal 300 through a wireless network 200, and is also connected to a traffic information providing center 400 for traffic conditions for respective positions in real-time. The term "vehicle" generally indicates a car in this instance and is not restricted to it. Further, the vehicle terminal 300 may be realized with a notebook computer, a PDA, or a mobile telephone.

The above-connected system 100 for providing origin and destination guide information receives current position information and moving direction information from the vehicle terminal 300 and selects an origin (referred to as an "origin link") from which the user may easily move.

In this instance, the vehicle terminal 300 calculates the vehicle's progressing direction, and the system 100 selects an origin link in consideration of the calculated progressing direction which aims at eliminating inconvenience caused when the vehicle must undesirably change directions when the origin link is selected in the opposite direction of the vehicle's progressing direction.

That is, the system 100 for providing origin and destination guide information provides road information to the user to select an origin link so that the user may establish a road type at the current position by using the vehicle terminal 300 when at least two types of roads (of a superhighway, an urban expressway, an overpass, an underground passage, and a general road) are provided in the vehicle progressing direction and within a predetermined range of current position (e.g., within a circle of a 100-meter radius).

When no two types of roads are provided in the vehicle progressing direction and within the predetermined range of current position, the system 100 selects a link that is the nearest to the position of the vehicle terminal 300 as an origin link.

Also, when no road is found within a predetermined range, the system 100 selects an origin link at the road out of the predetermined range. In this instance, the origin link does not include the superhighway and the urban expressway.

In most cases, the vehicle terminal 300 is generally positioned on the general road other than the superhighway or urban expressway, and the user cannot drive following the guided path when the superhighway or urban expressway is selected as an origin link.

When receiving a path request while moving, the system 100 selects an origin link in consideration of progressing direction information on the vehicle provided by the vehicle terminal 300. In this instance, the progressing direction information may be calculated by using a variation of position information provided by a GPS installed in the vehicle.

When the vehicle's progressing direction is not considered, paths are searched in the opposite direction of the vehicle's progressing direction, and the vehicle cannot drive on the provided path.

Also, the system 100 selects a destination link by considering the position and the type of destination desired by the user, and in detail, classifies destination links and selects desired ones according to conditions depending on the position and the type of destination.

In further detail, the system 100 selects a destination link in consideration of an adjacent link having a destination (a destination coordinate) on the right (or the left in the case of driving on the left) of the progressing direction of the vehicle, and a direction of the vehicle in order to prevent the path guide from being terminated while the user cannot directly reach the destination when the selected destination link and the progressing direction of the vehicle are opposite that of the destination.

When the user can access the destination in any direction (e.g., a crossroads or a subway station), the system 100 for providing origin and destination guide information selects links provided within a predetermined range (e.g., a circle of a 300-meter radius) as candidate destination links and determines the link for the optimized path as a destination link in consideration of an origin link from among the selected candidate links.

Also, when a plurality of approaches to the destination are provided (e.g., a large apartment complex or a park), the approaches are provided far apart from each other in most cases, and hence, the system 100 selects a plurality of approaches as candidate destination links and determines the link for the optimized path as a destination link in consideration of an origin link from among the selected candidate links.

However, since the vehicle cannot easily access a superhighway, an urban expressway, an overpass, or a subway in most cases when selecting a destination link, the system 100 again searches candidate destination links and determines a general road that is easily accessible by the vehicle as a destination link.

Superhighway resting places or gas stations can be destinations that the user actually desires to go to, and accordingly, the destinations accessible on the superhighways and urban expressways are processed as excepts.

The system 100 for providing origin and destination guide information generates the optimized path from among a plurality of paths provided from the origin to the destination according to the selected origin and destination links, generates guide information on the generated path, converts the guide information into a format displayable by the vehicle terminal 300, and provides the converted guide information.

As described, the system 100 selects the origin link in various manners according to the position of the vehicle and the type of road, and selects the destination link by applying different methods according to the position and type of destination.

A detailed configuration of the system 100 for providing origin and destination guide information will now be described.

Figure 3:
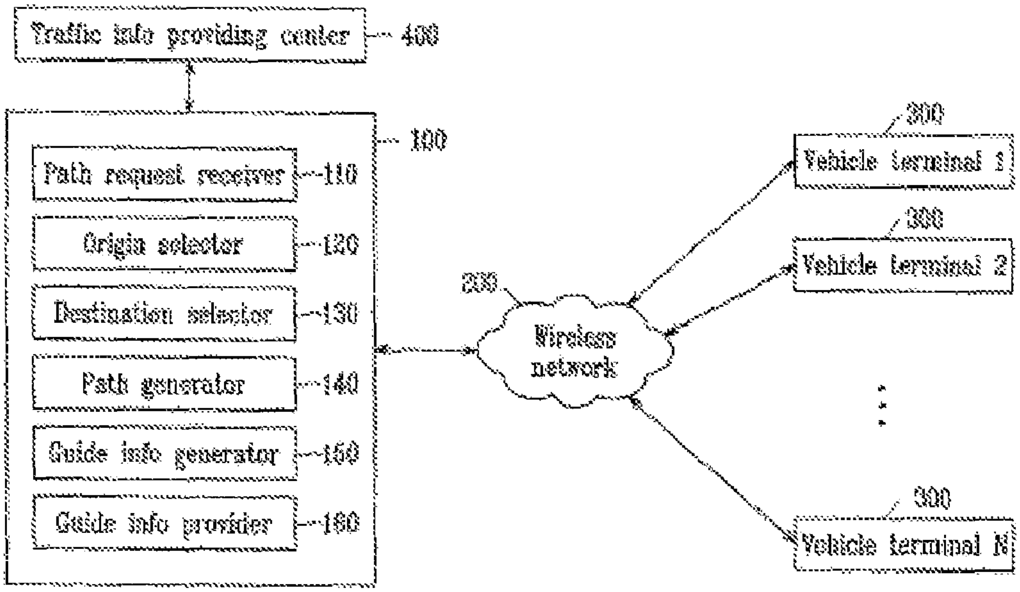
FIG. 3 shows a detailed configuration of a system for providing origin and destination guide information according to an exemplary embodiment of the present invention.

FIG. 3 shows a detailed configuration of the system for providing origin and destination guide information according to an exemplary embodiment of the present invention.

As shown, the system 100 for providing origin and destination guide information includes a path request receiver 110, an origin selector 120, a destination selector 130, a path generator 140, a guide information generator 150, and a guide information provider 160.

In detail, the path request receiver 110 receives a path request having the current position (an origin position) and the destination position of the vehicle from the vehicle terminal 300. The path request may further include a moving direction of the vehicle.

The origin selector 120 controls the user to select an origin link according to the current position of the vehicle, or selects an origin link except a superhighway and a urban expressway out of a predetermined range when no path search network is provided within a predetermined range.

The destination selector 130 selects a destination link by applying different methods according to the position and type of the destination.

The path generator 140 generates a path from origin to destination based on the selected origin link, destination link, real-time traffic information, and map link information. In this instance, the map link information includes at least one of the number of traffic lanes, the speed, and a road classification (e.g., superhighway, urban expressway, national road, or local road).

The guide information generator 150 generates guide information on the generated path through at least one of an adjacent map and speech information.

The guide information provider 160 converts the generated guide information into a format displayable by the vehicle terminal 300, and provides the converted guide information.

An operation of the system 100 for providing origin and destination guide information will now be described.

Figure 4:
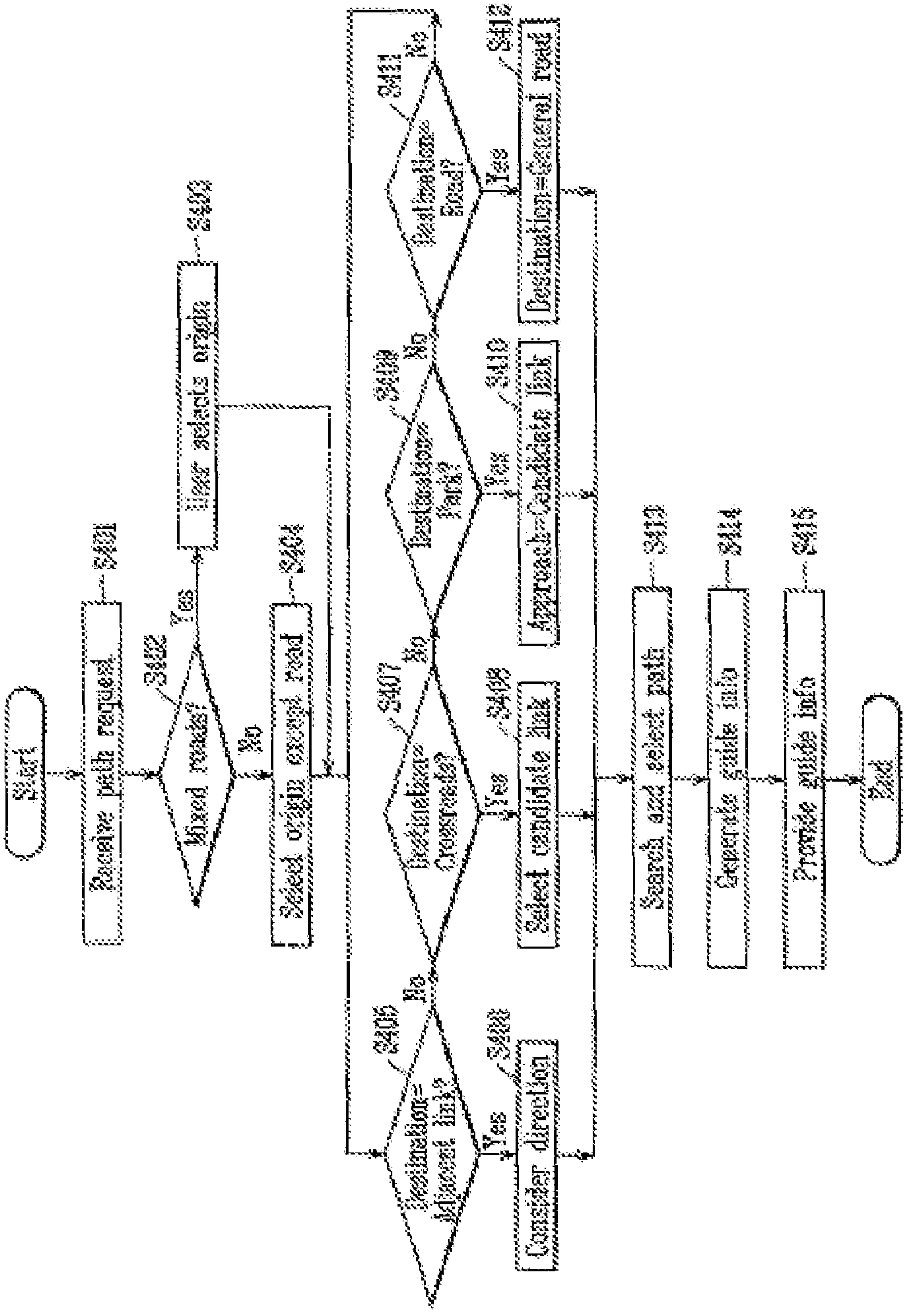
FIG. 4 shows an operational flowchart of a system for providing origin and destination guide information according to an exemplary embodiment of the present invention.

FIG. 4 shows an operational flowchart of a system for providing origin and destination guide information according to an exemplary embodiment of the present invention.

As shown, the path request receiver 110 receives a path request having origin position information and destination information obtained through a GPS installed in the vehicle from the vehicle terminal 300 in step S401. The path request may further include a progressing direction of the vehicle.

The origin selector 120 selects an origin link according to the received path request information (the current position and the progressing direction of the vehicle), and checks whether different types of roads (superhighway, an urban expressway, overpass, and subway) are provided together at the current position of the vehicle within a predetermined range (e.g., a circle of 100-meter radius) in step S402.

The origin selector 120 controls the user to select a road type of the origin link in step S403 when the different types of roads are found together, and the origin selector 120 selects the link that is the most adjacent to the vehicle to be an origin link when the different types of roads are not found together.

When the path request is generated while the vehicle moves, the origin selector 120 may select the origin link in consideration of the vehicle's progressing direction.

In this instance, the origin selector 120 selects the links other than a superhighway and an urban expressway from among the roads out of a predetermined range in step S404 when no roads are found in the range.

The destination selector 130 selects a destination link according to the position and type of the destination, and in detail, the destination selector 130 selects a destination link by considering the vehicle's progressing direction in step S406 when the destination link to be selected is a link adjacent to the destination in step S405.

Figure 5:
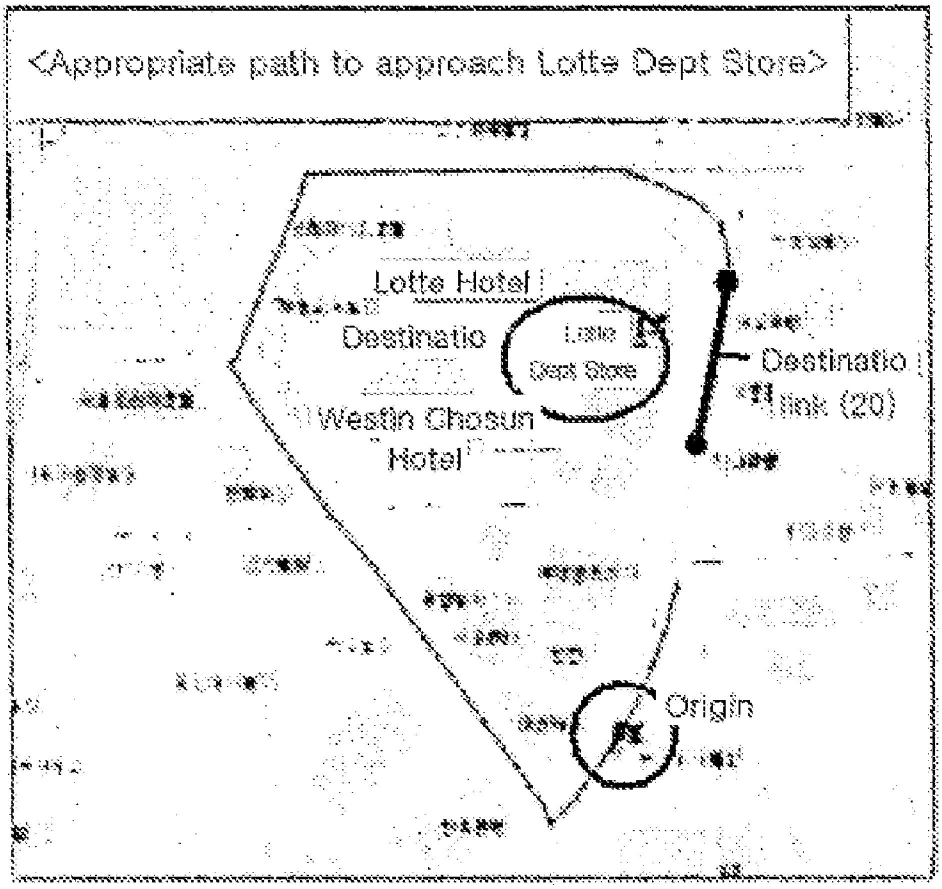
FIG. 5 shows a destination link in consideration of a position of the destination and a progressing direction of the vehicle according to an exemplary embodiment of the present invention.

It is desirable to select the destination link by considering the vehicle's progressing direction since the destination link selected according to the embodiment is near the destination in most cases, which is shown in FIG. 5.

FIG. 5 shows a destination link in consideration of a position of the destination and a progressing direction of the vehicle according to an exemplary embodiment of the present invention when driving on the right.

As shown, the vehicle proceeds in the seven o'clock direction (in the south-south-west direction). The destination selector 130 selects a destination link 20 so that the destination (Lotte Department Store) may be located on the right side of the vehicle's progressing direction since the destination must be located on the right side of the vehicle's progressing direction when driving on the right so that the vehicle may reach the destination.

The destination selector 130 selects a destination link so that the destination may be located on the left side of the vehicle's progressing direction when driving on the left. Accordingly, the destination selector 130 controls the user to easily access the desired destination.

Figure 6:
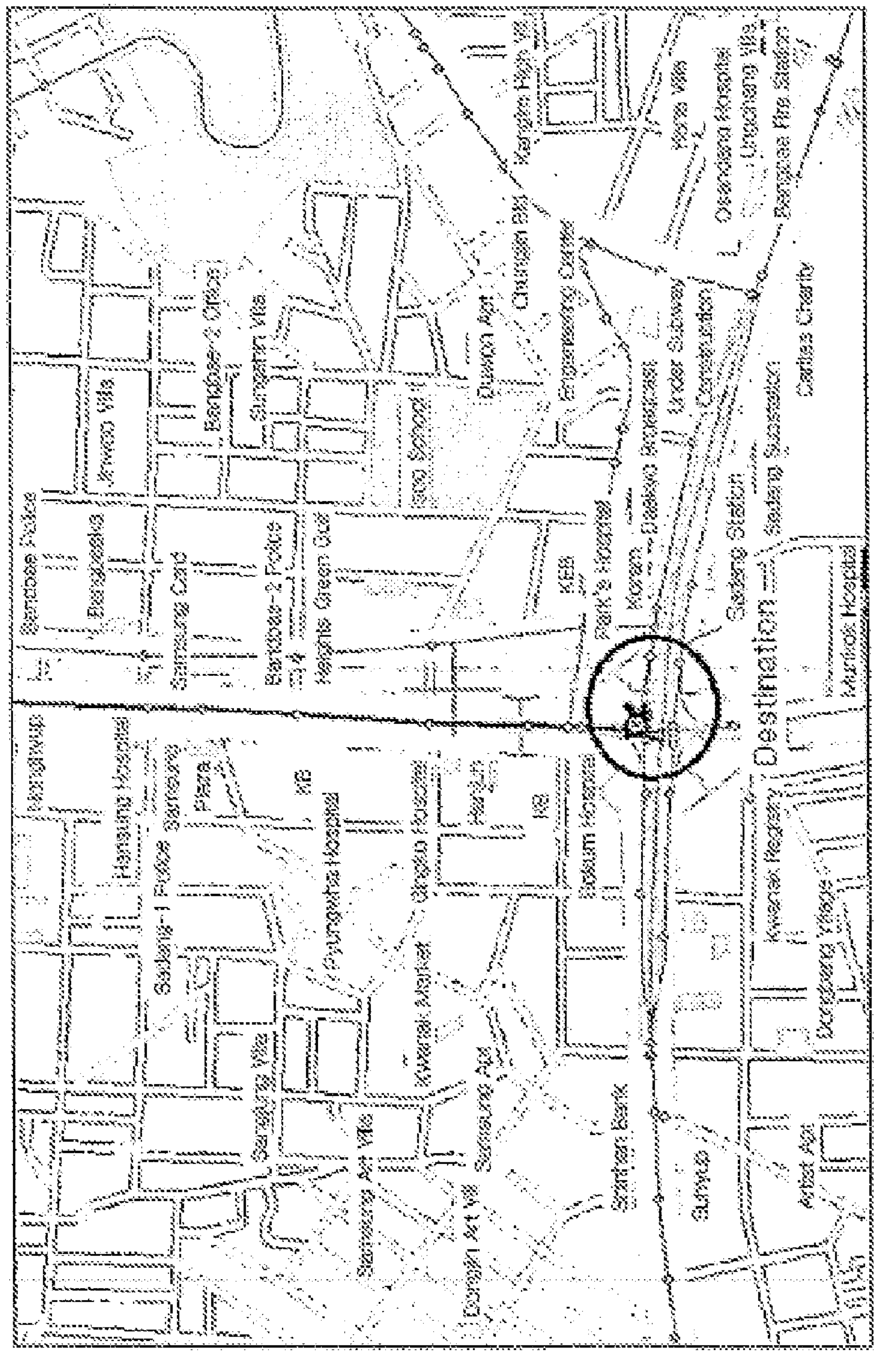
FIG. 6 shows a selected destination link when a subway station is given as the destination according to an exemplary embodiment of the present invention.

When the destination that the vehicle 300 desires to access does not correspond to the access direction (i.e., the vehicle's progressing direction), such as a crossroads or a subway station in step S407, the destination selector 130 selects the links provided within a predetermined range (e.g., a circle of a 300-meter radius) with respect to a corresponding destination coordinate to be candidate links in step S408, and selects a single link to be a final destination link from among the selected candidate destination links according to a subsequent optimized path in step S413, which is illustrated in FIG. 6.

FIG. 6 shows a selected destination link when a subway station is given as the destination according to an exemplary embodiment of the present invention.

As shown, when the destination is given to be Sadang station, the destination selector 130 selects a plurality of candidate links near Sadang station and determines the final destination link, thereby preventing the mobile terminal's roundabout on the destination.

An apartment complex or a park that the vehicle terminal 300 desires to reach has at least two approaches in most cases in step S409.

Therefore, the destination selector 130 selects a plurality of approaches as candidate destination links according to the multi-point POI (MPP) scheme in step S410, and determines a final destination link from among the candidate links according to the optimized path in step S413. An exemplifier for the MPP scheme is illustrated in FIG. 7.

Figure 7:
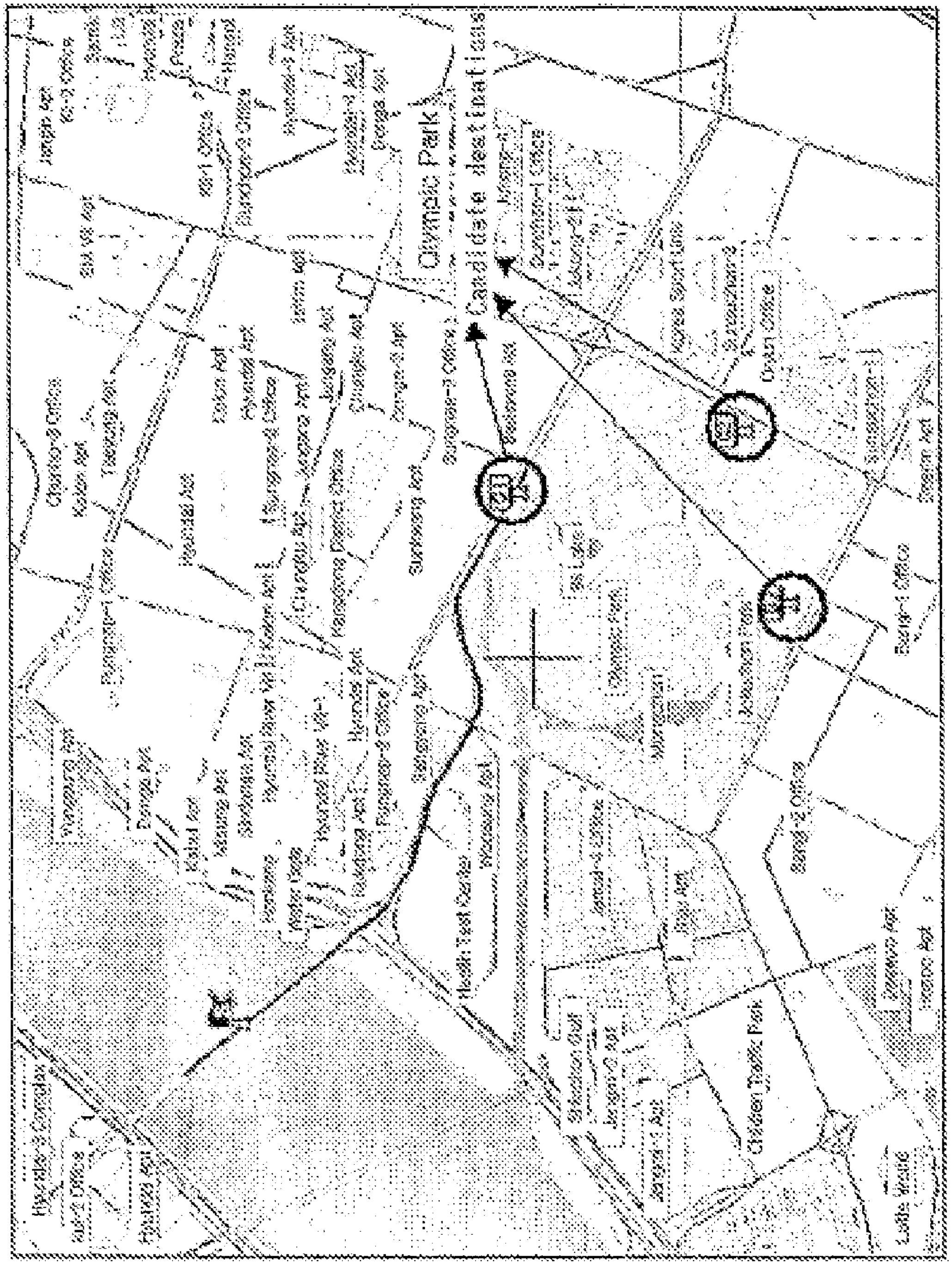
FIG. 7 shows a selected destination link when a park is given as the destination according to an exemplary embodiment of the present invention.

FIG. 7 shows a selected destination link when a park is given as the destination according to an exemplary embodiment of the present invention.

As shown, when the destination is Olympic Park, the destination selector 130 selects links for three approaches to be candidate destination links, and determines the final destination link according to the subsequently selected optimized path in step S413.

When the desired destination link is one of a superhighway, an urban expressway, an overpass, and a subway, the destination selector 130 again searches the destination links and selects a general road that is easy for the vehicle to access as a destination link in step S412. A method for selecting a destination link when the destination link is an urban expressway will now be described with reference to FIG. 8 and FIG. 9.

Figure 8:
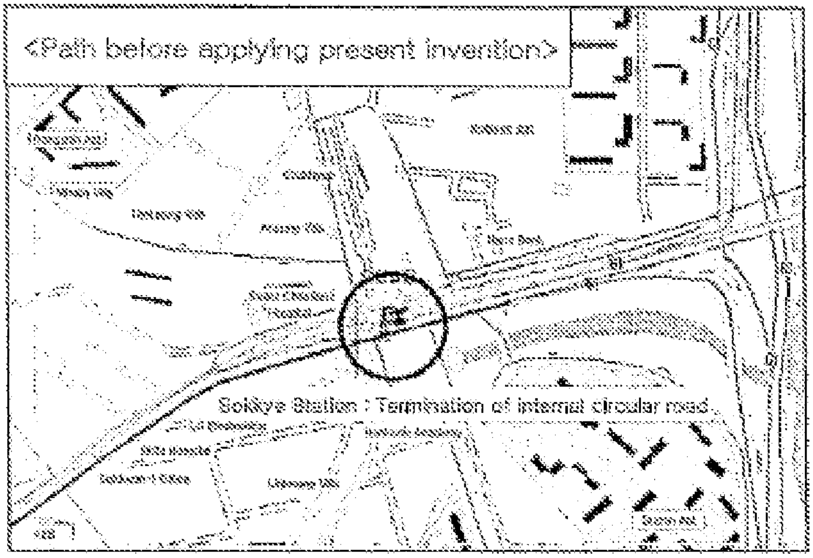
FIG. 8 shows a path found by a general path search when an urban expressway is given as a destination link.
Figure 9:
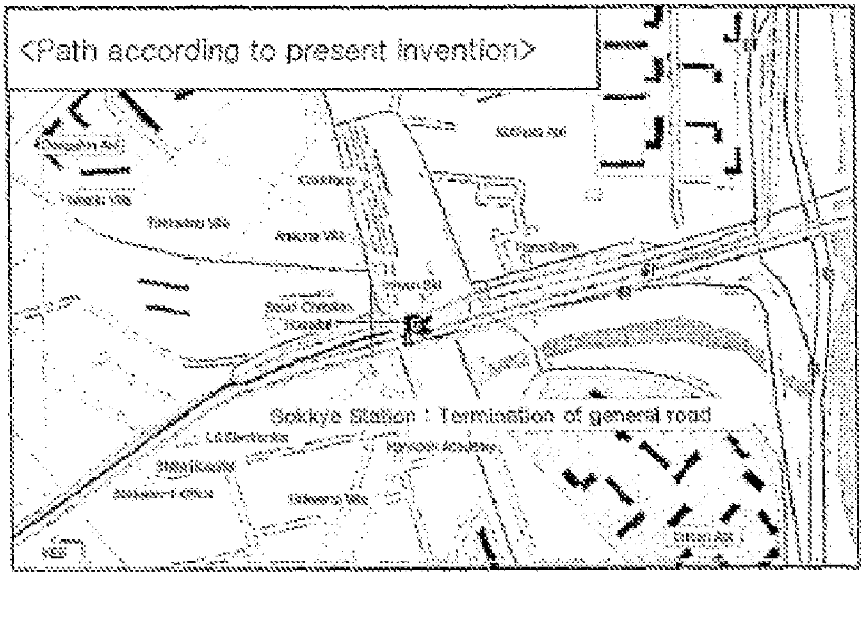
FIG. 9 shows a path found by a path search according to an exemplary embodiment of the present invention when an urban expressway is given as a destination link.

FIG. 8 shows a path found by a general path search when an urban expressway is given as a destination link, and FIG. 9 shows a path found by a path search according to an exemplary embodiment of the present invention when an urban expressway is given as a destination link.

As shown in FIG. 8, when the destination link is an internal circular road of Sokkye Station, the destination link of the path caused by a general path search becomes a link of the internal circular road, and therefore, the user must take a roundabout way to reach Sokkye Station, the destination.

However, as shown in FIG. 9, since the destination link is an internal circular road, the destination selector 130 searches links again and determines a general road located below the internal circular road to be the final destination road so that the user may easily move to the desired destination.

The path generator 140 generates a path from origin to destination based on the selected origin link, destination link, real-time traffic information provided by the traffic information providing center 400, and map link information in step S413. In this instance, when a plurality of destination links are provided, the path generator 140 generates a plurality of paths for the respective destination links and determines the optimized path from among the paths which is illustrated in FIG. 10.

Figure 10:
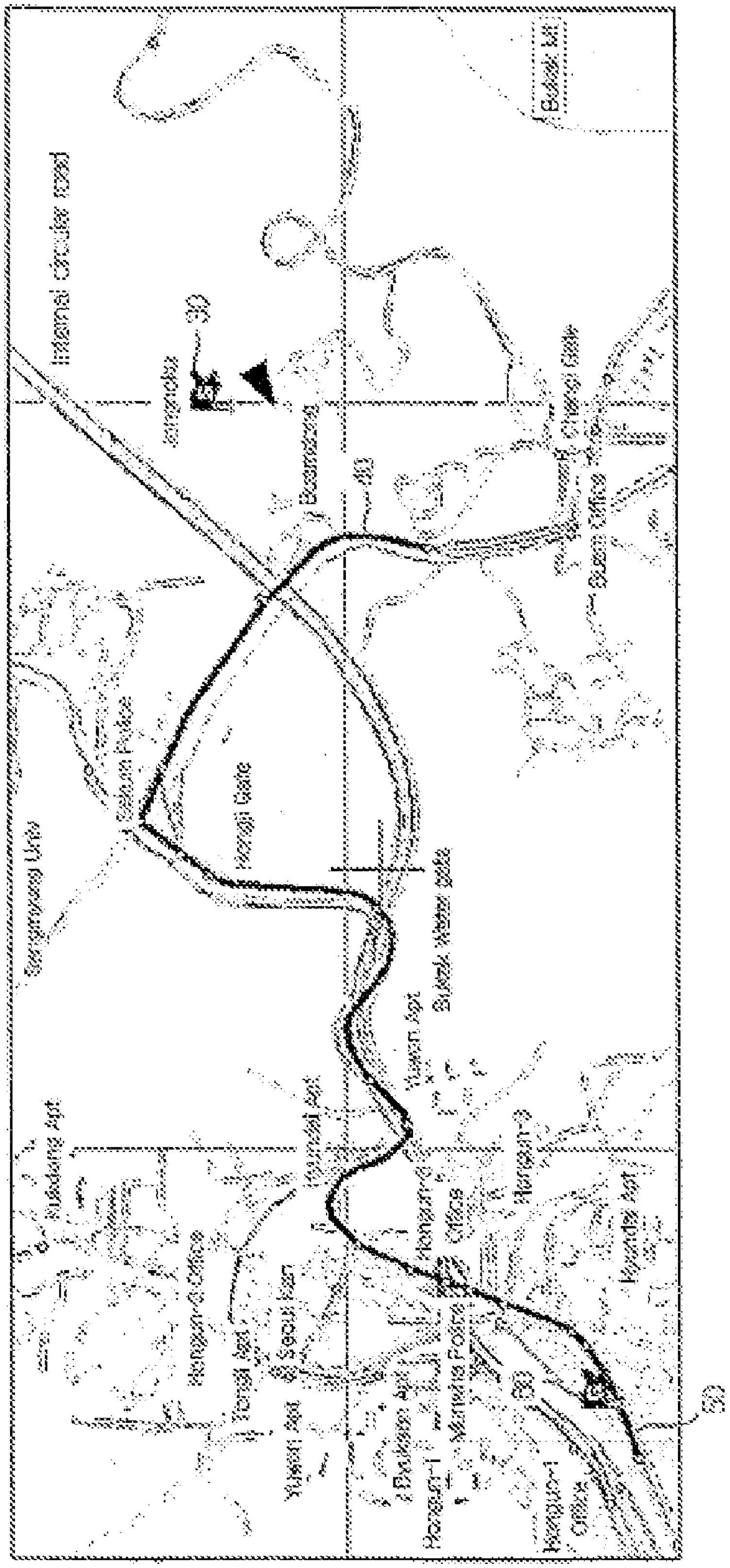
FIG. 10 shows link information from the final origin to the destination according to an exemplary embodiment of the present invention.

FIG. 10 shows link information from the final origin to destination according to an exemplary embodiment of the present invention.

As shown, the path generator 140 selects the single optimized path from the origin link 40 near Jongroku that is the origin 30 to the destination link 50 near the destination 60, and provides the optimized path.

The most adjacent link from the origin 30 is the internal circular road, but the origin selector 120 selects the link 40 provided within a predetermined range as an origin link since it is difficult to access the internal circular road.

The guide information generator 150 generates guide information having at least one of an adjacent map of the generated path and speech information in step S414, and the guide information provider 160 converts the generated guide information into a format normally displayable by the vehicle terminal 300, and provides the converted guide information in step S415.

Accordingly, the system for providing origin and destination guide information and the method thereof supplement the case of wrongly selecting the superhighway and the urban expressway when selecting the origin link, and selects the destination link by using a different method according to the position and the type of destination the vehicle desires to reach.

Therefore, the present invention allows the user to receive an accurate guide near the origin by increasing the accuracy of selecting the origin and the destination and receive a path for easy access to the desired destination, and increases satisfaction for the service since it provides no roundabout path near the destination.

The system for providing origin and destination guide information and the method thereof excludes superhighways and urban expressways that are difficult for the vehicle to access when the origin link is selected, and selects the destination link by using different methods according to the position and the type of destination the vehicle desires to reach. Accordingly, wasted time and resources which are generated when the user fails to find the accurate road near the origin or which occur when the user fails to reach the destination are prevented in advance to thus increase satisfaction of services.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A system for providing origin and destination guide information to a vehicle terminal connected through a wireless network, the system comprising:

an origin selector for selecting an origin link that is a road adjacent to an origin according to a direction and a current position of the vehicle terminal;

a destination selector for selecting a destination link that is a road adjacent to a destination according to a position and a type of the destination;

a path generator for generating a path from the origin link to the destination link based on the selected origin link, the selected destination link, real-time traffic information, and map information;

a guide information generator for generating guide information having at least one of an adjacent map of the generated path and speech information on the path; and a guide information provider for providing the generated guide information to the vehicle terminal, wherein the destination selector selects at least one destination link provided with a predetermined range of the destination coordinate and searches destination links again to select a desired destination link when the destination link to be selected is one of a superhighway, an urban expressway, an overpass, and a subway, and the path generator generates paths for the at least one destination link and determines an optimized path from among the generated paths.

2. A system for providing origin and destination guide information to a vehicle terminal connected through a wireless network, the system comprising:

an origin selector for selecting an origin link that is a road adjacent to an origin according to a direction and a current position of the vehicle terminal;

a destination selector for selecting a destination link that is a road adjacent to a destination according to a position and a type of the destination;

a path generator for generating a path from the origin link to the destination link based on the selected origin link, the selected destination link, real-time traffic information, and map information;

a guide information generator for generating guide information having at least one of an adjacent map of the generated path and speech information on the path; and a guide information provider for providing the generated guide information to the vehicle terminal, wherein the origin selector controls a user to select the origin link from among provided roads when at least two roads of a superhighway, an urban expressway, an overpass, and a subway are provided together within a predetermined range of the origin, and wherein the destination selector selects at least two approaches as destination links when the destination has the at least two approaches, and the path generator generates paths for the at least two selected destination links and determines an optimized path from among the generated paths.

3. The system of claim 2, wherein the destination selector searches destination links again to select a desired destination link when the destination link to be selected is one of a superhighway, an urban expressway, an overpass, and a subway.

4. A method for providing origin and destination guide information to a vehicle terminal connected through a wireless network, the method comprising:

a) selecting an origin link that is a road near an origin according to a direction and a current position of the vehicle terminal;

b) selecting a destination link that is a road near a destination in consideration of a position and a type of the destination;

c) generating a path from the origin link to the destination link based on the selected origin link, the selected destination link, real-time traffic information, and map link information; and d) generating guide information having at least one of an adjacent map of the generated path and speech information, and providing the generated guide information to the vehicle terminal, wherein b) comprises: selecting at least one link provided in a predetermined range of the destination coordinate to be a candidate destination link, and searching destination link again to select a desired destination link when the destination link to be selected is one of a superhighway, an urban expressway, an overpass, and a subway, and c) comprises: generating a respective path of the selected at least one candidate destination link and determining an optimized path from among the generated paths.

5. A method for providing origin and destination guide information to a vehicle terminal connected through a wireless network, the method comprising:

a) selecting an origin link that is a road near an origin according to a direction and a current position of the vehicle terminal;

b) selecting a destination link that is a road near a destination in consideration of a position and a type of the destination;

c) generating a path from the origin link to the destination link based on the selected origin link, the selected destination link, real-time traffic information, and map link information; and d) generating guide information having at least one of an adjacent map of the generated path and speech information, and providing the generated guide information to the vehicle terminal, wherein a) comprises: controlling a user to select a road type of the origin link when at least two of a superhighway, an urban expressway, an overpass, and a subway are provided together within a predetermined range of the origin, wherein b) comprises: selecting an approach to be a candidate destination link when the destination includes at least one approach, and wherein c) comprises: generating a respective path of the selected at least one candidate destination link; and determining an optimized path from among the generated paths.

6. The method of claim 5, wherein b) comprises: searching destination links again to select a desired destination link when the destination link to be selected is one of a superhighway, an urban expressway, an overpass, and a subway.

* * * * *